United States Patent
Tanaka et al.

(10) Patent No.: US 6,397,161 B1
(45) Date of Patent: May 28, 2002

(54) METHOD FOR STABILIZING OUTPUT OF RAIN SENSOR AND PROTECTION METHOD THEREFOR

(75) Inventors: Shuhei Tanaka; Tadashi Koyama; Keiji Tsunetomo, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/211,318

(22) Filed: Dec. 16, 1998

(30) Foreign Application Priority Data

Dec. 17, 1997 (JP) ............................................. 9-347745
Dec. 17, 1997 (JP) ............................................. 9-347747

(51) Int. Cl.$^7$ ............................................. G01K 11/30
(52) U.S. Cl. ......................... 702/134; 63/3.7; 250/573; 318/483; 327/350; 340/602; 702/132
(58) Field of Search ................................ 702/134, 130, 702/132; 318/483; 307/651; 62/65, 97, 122

(56) References Cited

U.S. PATENT DOCUMENTS

| | | | | |
|---|---|---|---|---|
| 3,569,736 A | * | 3/1971 | Tschinkel | 307/230 |
| 6,084,519 A | * | 7/2000 | Coulling et al. | 340/602 |
| 6,097,167 A | * | 8/2000 | Tanaka et al. | 318/483 |
| 6,112,625 A | * | 9/2000 | Yoshida et al. | 62/3.7 |
| 6,157,897 A | * | 12/2000 | Yoshikawa | 702/132 |

FOREIGN PATENT DOCUMENTS

JP 2-67945 3/1990

* cited by examiner

*Primary Examiner*—Arthur T. Grimley
*Assistant Examiner*—John Le
(74) *Attorney, Agent, or Firm*—Pillsbury Winthrop LLP

(57) ABSTRACT

A rain sensor including light emitting means 7 for guiding light into a window glass so as to undergo total internal reflection within the window glass, light receiving means 8 for receiving the light which has undergone total internal reflection within the window glass, and means for detecting the amount of water drops adhered to or present upon the window glass so as to output a driving signal to a wiper driver apparatus 20, a difference signal corresponding to a difference between a preset reference value and an output signal of an amplifier circuit 17 of the light receiving means is fed back to the amplifier 17, and an amplification factor of the amplifier circuit 17 is adjusted so as to maintain the output signal thereof at a constant value irrespective of the operation condition of the wiper, when electrical power is applied to the rain sensor 2. Furthermore, in a protecting method for the rain sensor 2, a driving current fed to light emitting element 10 is measured and converted into an ambient temperature, and a driving current supplied to the light emitting element 10 by the driver circuit 12 is stopped when the converted value is outside a preset temperature range, by turning a switch circuit 14 to OFF.

4 Claims, 4 Drawing Sheets

METHOD FOR STABILIZING OUTPUT OF RAIN SENSOR AND PROTECTION METHOD THEREFOR

BACKGROUND OF THE INVENTION

1. Field of the Invention

The present invention relates to a method for stabilizing the output of a rain sensor for use in controlling the driving of a wiper, and to a protection method for the rain sensor for preventing malfunction thereof due to an increase or decrease in ambient temperature.

2. Description of Prior Art

As a conventional controller apparatus utilizing a rain sensor, a wiper controller apparatus of the water drop sensitive-type as disclosed in Japanese Patent Laying-Open No. Hei 2-67945 (1990) is already known. In this prior art document, light means (i.e., light emitting means) and detection means (i.e., light receiving means) are positioned upon an inside surface of a window glass, opposing to each other at a distance, within a wiping area of a wiper wiping an outside surface of the window glass, and the adhesion or presence of the water drops upon the outside surface of the window glass is decided or detected on the basis of a difference between output signal levels generated from the detection means before and after driving of the wiper, so as to drive the wiper.

However, in the conventional wiper controller apparatus of water drop sensitive-type, the output signal from the light receiving means fluctuates in the following cases although no water is adhered to or present upon the outside surface of the window glass, for instance, when the outside surface of the window glass is soiled or dirty, when the emitted output light is changed for any reason (such as change or deterioration of a light emitting source with the passage of time or age, etc.), when amplification factor(s) of circuit(s) is/are changed due to the fluctuation of ambient temperature, and further when noise from the outside affect the device.

Accordingly, it has a drawback in that the wiper, in those cases mentioned above, is sometimes driven though it is not necessary since the light receiving means erroneously outputs a signal as if the water drops are adhered or present upon the outside surface of the window glass.

Further, another wiper controller apparatus of the water drop sensitive-type is also known wherein the light emitting means and the light receiving means are positioned on an inside surface of the window glass opposing to each other at a distance within the wiping area of the wiper wiping the outside surface of the window glass, and the adhesion or presence of the water drops upon the outside surface of the window glass is decided or detected on the basis of a difference between output signal levels from the detection means before and after the driving of the wiper, so as to drive the wiper.

However, this conventional wiper controller apparatus of the water drop sensitive-type also has a drawback in that malfunctions can occur in various circuits or in that the light emitting element, such as a laser diode (LD), can be damaged since a rain sensor is always under the condition of driving, not only when it rains but also under bright sunshine when no wiper is needed to be driven.

Further, there is also a possibility that the wiper may become frozen and then is non-operable under sub-zero ambient temperatures, and therefore it has other drawbacks in that excessive driving current flows through the wiper driving motor if the rain sensor is switched to the driving condition, resulting in the driving motor being burned out.

SUMMARY OF THE INVENTION

For resolving the above-mentioned drawbacks, according to the present invention, there is provided a method for stabilizing the output of a rain sensor for a wiper driver apparatus, said rain sensor comprising light emitting means for guiding light into a window glass so as to undergo total internal reflection within said window glass; light receiving means having an amplifier circuit and for receiving the light which has undergone total internal reflection within said window glass; and, means for detecting the amount of water drops adhered or present upon an outside surface of said window glass based on an output signal of said light receiving means and for outputting a driving signal to the wiper driver apparatus, wherein said method comprises:

applying power from an electric power source to the rain sensor;

obtaining a difference signal corresponding to a difference between a preset reference value and the output signal of the amplifier circuit of said light receiving means;

feeding said difference signal back to said amplifier circuit; and adjusting an amplification factor of said amplifier circuit so as to maintain the output signal of said amplifier circuit at a constant value.

With this method, when power has been applied to the rain sensor from an electric power source, a difference signal corresponding to the difference between a preset reference value and an output signal of the amplifier circuit of the light receiving means is obtained and is fed back to the amplifier, and further the amplification factor of the amplifier circuit is adjusted so as to maintain the output signal thereof at a constant value, irrespective of the operation condition of the wiper. Therefore, the output signal of the amplifier circuit is always maintained at a constant value, thereby ensuring no decrease in sensitivity in the following cases, that is, when the window glass is soiled or dirty upon the outside surface thereof, when a fluctuation occurs in the output light which is received by the light receiving means for any reason, when the amplification factor(s) of circuit(s) is/are changed due to fluctuations in the ambient temperature, and when externally generated noise is present, and so on.

Further, according to the present invention, there is also provided a protection method for a rain sensor comprising light emitting means for guiding light into a window glass so as to undergo total internal reflection within said window glass; light receiving means for receiving the light which has undergone total internal reflection within said window glass; and means for detecting the amount of water drops adhered or present upon an outside surface of said window glass based on an output signal of said light receiving means, wherein said method comprises:

measuring a driving current supplied to said light emitting means;

converting the driving current into a value corresponding to the ambient temperature; and stopping supply of the driving current to said light emitting means when said converted value of ambient temperature exceeds a preset higher temperature.

With this method, by selecting the preset higher temperature value at a temperature corresponding to the condition of bright, hot sunshine when no wiper operation is needed, the rain sensor is saved from any damage to the light emitting element, comprising, for example, a laser diode (LD), and from any malfunctions of various circuits thereof, since it remains in a non-driving condition when the ambient temperature exceeds the preset higher temperature value.

Further, according to the present invention, there is also provided a protection method for a rain sensor comprising light emitting means for guiding light into a window glass so as to undergo total internal reflection within said window glass: light receiving means for receiving the light which has undergone total internal reflection within said window glass; and means for detecting the amount of water drops adhered or present upon an outside surface of said window glass based on an output signal of said light receiving means, wherein said method comprises:

measuring a driving current supplied to said light emitting means;

converting the driving current into a value corresponding to the ambient temperature; and stopping supply of the driving current to said light emitting means when said converted value of the ambient temperature is less than a preset lower temperature.

With this method, by selecting the preset lower temperature value at a temperature corresponding to a few °C. where freezing will not occur, the driving motor of the wiper is saved from burn-out caused by excessive driving current flowing therethrough in the case where the wiper blade is inoperable due to the freezing thereof, since the rain sensor remains in a non-driving condition until the ambient temperature reaches the preset lower temperature.

Moreover, according to the present invention, there is further provided a protection method for a rain sensor comprising light emitting means for guiding light into a window glass so as to undergo total internal reflection within said window glass; light receiving means for receiving the light which has undergone total internal reflection within said window glass; and means for detecting the amount of water drops adhered or present upon an outside surface of said window glass based on an output signal of said light receiving means, a temperature detecting element being provided in the vicinity of said rain sensor, wherein said method comprises:

obtaining an output signal from said temperature detecting element; and stopping supply of a driving current to said light emitting means when said output signal of said temperature detecting element exceeds a preset higher temperature.

With this method, by selecting the preset higher temperature value at a temperature corresponding to the situation of bright, hot sunshine, where no wiper operation is needed, the rain sensor is protected from damage to its light emitting element, comprising, for example, a laser diode (LD), and is protected from malfunctions of various circuits thereof, since the device remains in the non-driving condition when the ambient temperature exceeds the preset higher temperature value.

Furthermore, according to the present invention, there is also provided a protection method for a rain sensor comprising light emitting means for guiding light into a window glass so as to undergo total internal reflection within said window glass; light receiving means for receiving the light which has undergone total internal reflection within said window glass; and means for detecting the amount of water drops adhered or present upon an outside surface of said window glass based on an output signal of said light receiving means, a temperature detecting element being provided in the vicinity of said rain sensor, wherein said method comprises:

obtaining an output signal from said temperature detecting element; and stopping supply of a driving current to said light emitting means when said output signal of said temperature detecting element is less than a preset lower temperature.

With this method, by selecting the preset higher temperature value at a temperature corresponding to a few °C. where freezing will not occur, the driving motor of the wiper is saved from burn-out caused by any excessive driving current flowing therethrough in the case where the wiper blade is inoperable due to the freezing thereof, since the rain sensor is in the non-driving condition until the ambient temperature reaches the preset lower temperature value.

Further, according to the present invention, in the protection method for a rain sensor as mentioned above, the higher preset temperature value and lower preset temperature value can be freely adjusted in advance.

With the higher preset temperature value and lower preset temperature value being freely adjustable, they can be preset depending upon local environmental conditions under which the rain sensor will be used.

DETAILED DESCRIPTION OF PREFERRED EMBODIMENTS

Hereinafter, embodiments according to the present invention will be fully explained by referring to the attached drawings.

Figure 1:
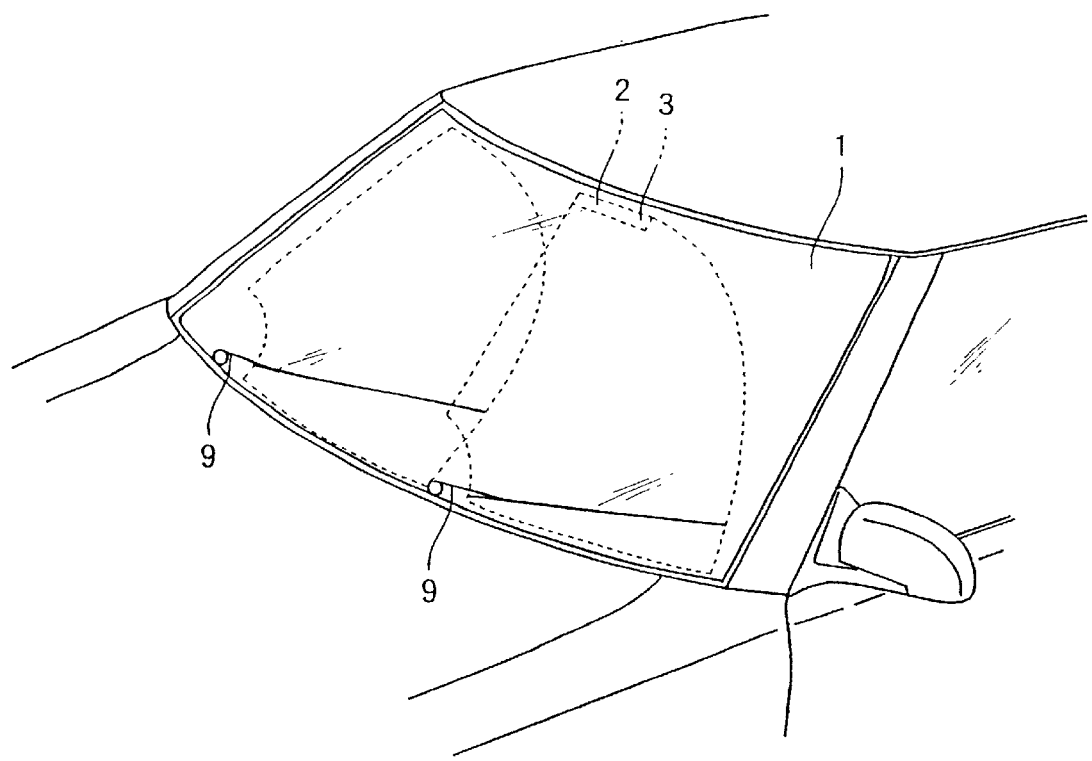
FIG. 1 shows a perspective view of a front portion of an automobile to which the present invention is applied.

Referring to FIG. 1, a rain sensor 2 is attached upon an interior surface of the front window glass (windshield) 1 of an automobile with adhesive material (for example, adhesive tape) 3, located within a wiping area or region of one or more wipers 9 which wipe an outside surface thereof. The adhesive material (adhesive tape) 3 is selected to have a refractive index that is nearly equal to that corresponding to the ambient temperature; and of the window glass (i.e., 1.48). Further, as the window glass, there is used a soda lime glass corresponding to the ambient temperature; and containing mainly $SiO_2$, at a thickness of 5 mm.

Figure 2:
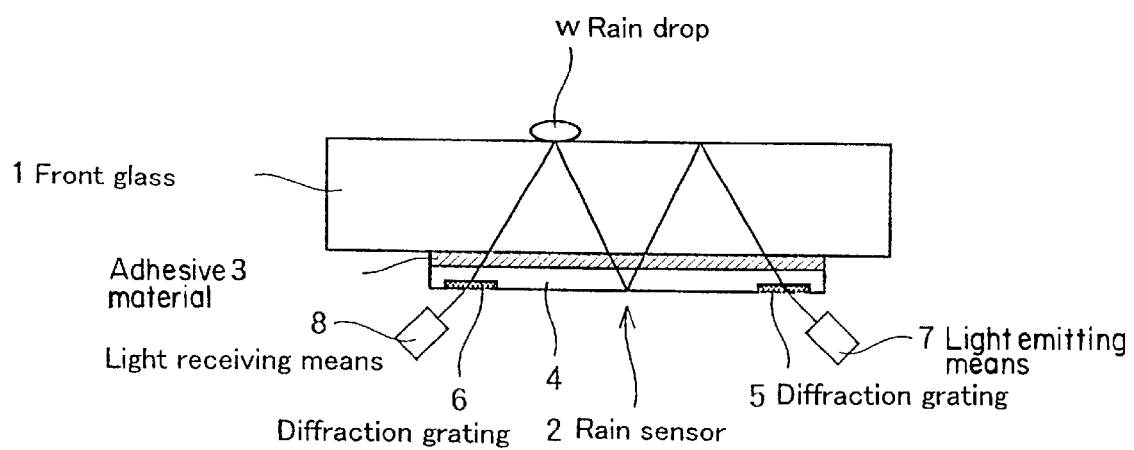
FIG. 2 shows a construction of a rain sensor according to the present invention.

The rain sensor 2 comprises, as shown in FIG. 2, diffraction gratings 5 and 6 which are formed on a surface of a glass substrate 4 by laser light. The adhesive material 3 is pasted all over the surface of the glass substrate 4 so as to closely contact the rain sensor 2 onto the window glass 1.

Further, in a vicinity of diffraction grating 5, there is provided light emitting means 7 comprising a light emitting element such as a light emitting diode (LED) or a laser diode (LD), while in a vicinity of diffraction grating 6, there is provided a light receiving means 8 comprising a light receiving element such as a photo diode (PD). Light emitting means 7 and light receiving means 8 may be provided closely contacted with the diffraction gratings 5 and 6, respectively.

Also, diffraction gratings 5 and 6 are preferably formed by an ablation phenomenon which is caused by irradiation of a laser beam upon the surface of the glass substrate 4.

The diffraction gratings here comprise optical elements, such as minute or fine grooves that are formed on the surface of the glass substrate. Ideally, the diffraction grating is designed to have a groove pitch ranging between 0.4–3 μm, depending upon various uses or purposes thereof. Diffraction gratings are mainly used to obtain a spectrum, and can also be used to divide or bend light by diffracting light, in particular in a case where monochromic light is used as a light source.

Further, as a diffraction grating other than that mentioned above, other types of diffraction gratings may also be adopted, such as those of the reflection type, a type which comprises a slit in shape thereof, and further a type in which the refractive index thereof is varied periodically.

Figure 3:
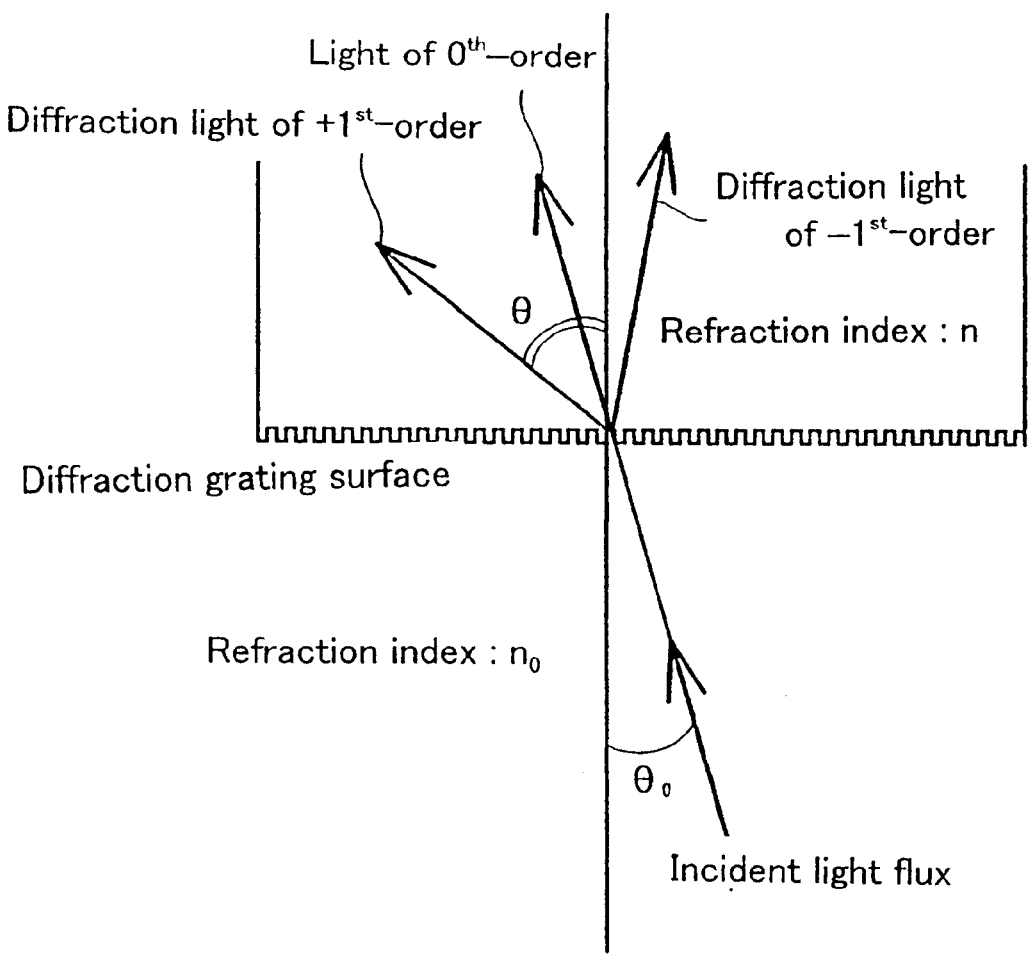
FIG. 3 shows an explanatory view of the function of a diffraction grating.

The function which is utilized by the present invention is a phenomenon of the diffraction grating, wherein the diffraction light appears on a constant rule in the case where monochromatic light is incident thereupon. As the diffraction light, as is shown in FIG. 3, a primary ($1^{st}$ order) diffraction lobe is generated at a constant angle with respect to the incident light. Further, though diffraction lobes of higher orders are also generated, the primary diffraction light is mainly used because the higher ones have less light (i.e. are weaker in intensity).

When light is incident on a surface, the relationship in angles between the incident light and the diffraction light can be expressed by the following equation (1). Namely, assuming that the angle of the incident light is $\theta_0$, the angle of $M^{th}$ order $\theta$, the wavelength of the incident light $\lambda$, the pitch of the grooves d, the refractive index of the medium at the exit side n, and the refractive index of the medium at the incident side $n_0$, then the angular relationship can be expressed as follows:

$$n \cdot \sin \theta - n_0 \cdot \sin \theta_0 = m\lambda/d, \ (m=0, \pm 1, \pm 2, \ldots) \quad (1)$$

In the case where the medium of the incident side is air and a transparent glass plate is the medium at the exit side, the refractive index of air being ($n_0 = 1.0$), equation (1) clearly shows that the angle of the light traveling within the transparent plate can be adjusted by changing the incident angle of the light which is incident upon the diffraction grating.

As mentioned above, by using a diffraction grating, it is possible to introduce light into the transparent plate at an arbitrary angle. Further, by appropriately selecting the incident angle onto the diffraction grating, it is also possible to have the introduced light undergo total internal reflection within the transparent plate.

Further, upon the basis of the same principle, it is also possible to have the light undergoing total internal reflection within the transparent plate and to exit to the outside, i.e., from within the transparent plate into the surrounding air.

Moreover, for obtaining an incident angle at which total internal reflection is initiated upon the boundary surface between the air and the glass, i.e., a critical angle, the following calculation was conducted using Snell's law. Snell's law itself can be expressed by the following general equation (2):

$$n_0 \cdot \sin \alpha_0 = n \cdot \sin \alpha \quad (2)$$

where $\alpha$ and $\alpha_0$ are the incident and refracting angles with respect to a normal line at the boundary between surfaces of materials having refractive indexes n and $n_0$ ($\alpha$: incident angle, $\alpha_0$: refraction angle).

Assuming that the refractive index of the front windshield glass is n=1.48 and the refractive index of air is $n_0$=1, as is mentioned above, then the condition to obtain total internal reflection inside the glass plate can be determined, and $\alpha$=42.5° from equation (2) since $\alpha_0$=42.5°. Accordingly, total internal reflection occurs within the medium of the front windshield glass if the incident angle $\alpha$ is equal to or greater than the angle 42.5°.

Further, in a case where water is present upon or adhered to the window glass, the value of $\alpha$=64.0° can be obtained from a similar calculation for obtaining total internal reflection within the glass by assuming that the refractive index of water is $n_0$=1.33°. Accordingly, within the region of incident angles of $\alpha$ from 42.5° up to 64.0°, total internal reflection occurs within the glass if no water is adhered to nor present upon the glass, while it does not occur within the glass if water is adhered or present thereupon. Therefore, within this range, no light traveling within the glass escapes outside through the water.

For causing such reflection, the incident angle of the diffraction grating is suitably adjusted. Namely, the incident angle upon the diffraction grating is calculated so as to obtain a reflection angle of 42.5° within the glass by using the above-mentioned equation (1). For a diffraction grating having a groove pitch d of 1020 nm formed, on the glass surface, an incident angle of 22° can be obtained when using the primary plus (+$1^{st}$ order) diffraction light lobe from a laser beam having a wavelength of 633 nm emitted from a He—Ne laser.

Further, for obtaining the reflection angle 64.0° within the glass, it is apparent that the incident angle upon the diffraction grating is 45° from the same calculation. In the present embodiment, the light Is incident upon the diffraction grating 5 at an angle of 45°. This light, which has undergone total internal reflection at this time, exits from the other diffraction grating 6.

Moreover, in the case where water drops W are present at plural points of total internal reflection, the light exiting from the diffraction grating 6 will be reduced in intensity, in particular when water drops are adhered to or present upon a large number of total internal reflection points, then the output light is reduced by about $\frac{1}{50}$. Note only one water drop W is shown in FIG. 2, although the number is actually more than 1.

Namely, it can be confirmed that the presence of water on the surf ace of the glass can be detected with sufficient sensitivity and is reflected in the strength of the exiting light. Further, when the incident angle upon the diffraction grating is increased gradually, the same phenomenon also occurs.

However, if the incident angle comes to be greater than 64°, even though water drops are adhered to or present upon the points of total internal reflection, the exiting light does not change in intensity. This angle almost corresponds with the angle at which the condition of total internal reflection does not change irrespective of the adhesion or presence of water drops.

Figure 4:
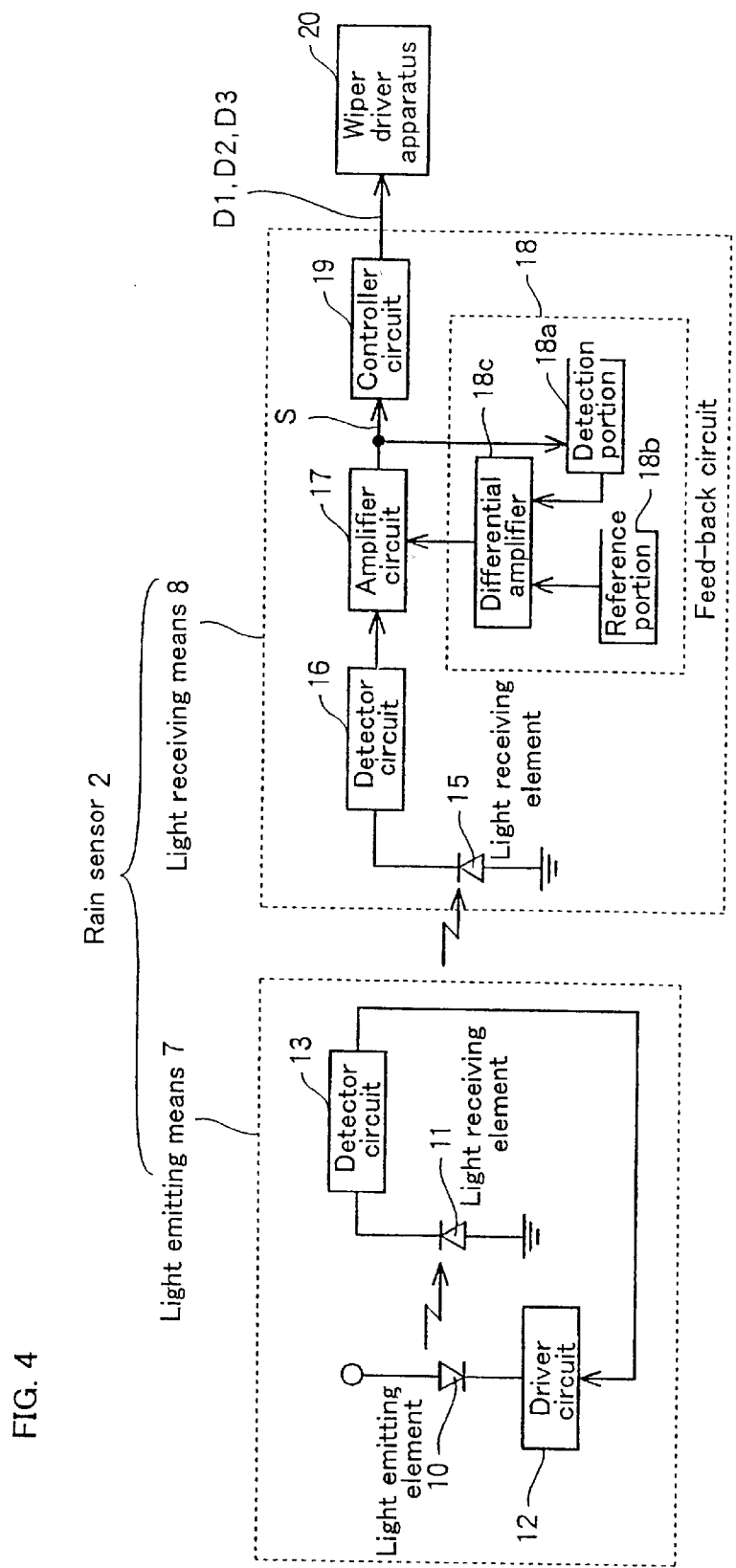
FIG. 4 shows a block diagram of the structure that reduces to practice the method for stabilizing output of a rain sensor according to the present invention; and, FIG. 5 shows a block diagram of the structure to which the protection method for a rain sensor according to the present invention is applied.

The construction for practicing the method for stabilizing output of the rain sensor according to the present invention, as is shown in FIG. 4, comprises a rain sensor 2 having a light emitting means for guiding the light into the front window glass 1 in such a manner that it undergoes total internal reflection upon the inside surface thereof and a light receiving means 8 for receiving the light that has been multi-reflected within the window glass 1, and a wiper driver means 20 for driving the wiper 9 at a desired velocity based upon an output signal from the light receiving means 8.

The light emitting means 7 comprises a light emitting element 10 such as a LED, LD and so on, a light receiving element 11 for detecting the light output from the light emitting element 10, such as a PD and so on, a driver circuit 12 for making the light emitting element 10 output a light beam modulated with a predetermined frequency, and a detector circuit 13 for receiving a signal corresponding to the modified component from the output light of the light receiving element 11.

Also, the output signal of the detector circuit 13 is fed back to the driver circuit 12.

In the light emitting means 7, since the signal corresponding to the modified component is received from the output signal of the light receiving element 11 by the detector circuit 13 and is fed back to the driver circuit 12 of the light emitting element 10, the output of light emission by the light emitting element 10 can be controlled to a desired value, and the output of light by the light emitting element 10 can be maintained at a desired value irrespective of any change in the ambient temperature of the light emitting means 7.

Further, the light receiving means 8 comprises a light receiving element 15 such as a PD and so on, a detector circuit 16 for receiving the signal corresponding to the modified component by the driver circuit 12 of the light emitting means 10, an amplifier circuit 17 for amplifying the signal output from the detector circuit 16, a feedback circuit 18 for maintaining the output signal S of the amplifier circuit 17 at a constant value when no water is adhered to or present upon the outside surface of the window glass 1, and a controller circuit 19 which calculates and processes the output signal S of the amplifier circuit 17 so as to output three kinds of signals, i.e., so as to switch a first output signal D1, a second output signal D2 and a third output signal D3 into the "ON" condition).

Here, the "ON" condition means a high (H) level when it is positive in logic, while it turns to a low (L) level when negative, or "OFF".

Since the detector circuit 16 takes out or receives only the signal corresponding to the modified component generated at the light emitting means 10 from the output signal of the light receiving element 15 to be input into the wiper driver apparatus 20 through the amplifier circuit 17 and the controller circuit 19, the wiper controller apparatus will never be operated erroneously, even under the influence of outside ambient light, which can sometimes reach 150,000 lux under strong sunlight in mid-summer, though it may be only a few lux in darkness at midnight.

The feedback circuit 18 comprises a detector portion 18a for detecting (or sampling) the output signal S of the amplifier 17, a reference portion 18b for providing a reference voltage VR corresponding to a desired output signal S when no water is adhered nor present upon the outside surface of the front window glass 1, and a differential amplifier 18c for amplifying a voltage difference between the reference voltage VR and the output signal S (VR−S= $\Delta$V) to be outputted into the amplifier circuit 17.

The timing for feeding back the voltage difference $\Delta$V between the reference voltage VR and the output signal S, in other words, the operation of the feedback circuit 18, is such that it is initiated when an electric power source for the rain sensor 2 is switched ON irrespective of the operation condition of the wiper 9, and thereafter it is repeated at a constant time interval, for example, every 1 minute.

The amplifier circuit 17, receiving the output signal of the feedback circuit 18, varies the amplification factor in such a manner that the output signal S come to be the reference voltage VR.

Accordingly, even in those cases where the window glass 1 is soiled or dirty upon the outside surface thereof, where fluctuations occur in the output of light received by the light receiving means 8 for any reason (i.e., change or deterioration in the output of the light emitting element 10 with the passage of time or age, etc.), where the amplification factor (s) of the circuit(s) is/are changed due to the fluctuation of ambient temperature, or where outside noise is present, the output signal S of the amplifier circuit 17 can be maintained at a constant value based on the timing of the turning-on of the power for the rain sensor 2, irrespective of the operation condition of the wiper.

Further, by storing or recording the voltage difference $\Delta$V just before the stoppage of the rain sensor 2 (for example, in a condition where the engine of the vehicle is stopped) in a memory (not shown in the figure), the voltage difference $\Delta$V can be fed back when the rain sensor 2 is initiated the next time.

In the controller circuit 19, first of all, the output signal S of the amplifier circuit 17 is compared with three preset voltage levels, sequentially from the higher one, i.e., a first preset level R1, a second preset level R2, and a third preset level R3.

With the rain sensor 2 which is used in the present invention, as previously mentioned, the more that water drops are adhered to or present upon the outside surface of the window glass 1, the lower the output signal level of the light receiving element 15. In other words, the amount or degree of water drops that are present is detected. Therefore, the voltage level of the output signal S is at a maximum when no water drops are adhered to nor present on the surface of the window glass, while is at a minimum when a large number of water drops are adhered to or present thereon.

Further, when the output signal S of the amplifier circuit 17 is less or smaller than the first preset level R1 (S<R1), the first output signal is switched to the H ("HIGH") level, the second output signal D2 is switched to the H level when it is less or smaller than the second preset level R2 (S<R2), and further the third output signal D3 is switched to the H level when it is less or smaller than the third preset level R3 (S<R3).

Here, when the first output signal D1 is at the H level, this corresponds to a condition of drizzly or misty rain or a condition of light rain. When the second output signal D2 is at the H level, it corresponds to a condition of medium rain, and when the third output signal D3 is at the H level, it corresponds to a condition of heavy rain. Note that although in this example the source of the water drops is given as rain, the water drops may come to be present on the front windshield from other sources, for example, from heavy fog.

Then, all the output signals D1, D2 and D3 of the controller circuit 19 are switched to the H level, a wiper driving signal WD is outputted from the wiper driver circuit 20, and the wipers 9 start to be driven.

In this instance, the driving of the wipers 9 can be started after ejection of a predetermined amount of window washer liquid onto the front window glass 1 or together with the ejection thereof.

After that, even if the third output signal D3 is switched to the L level, the wiper driving signal WD continues to be outputted as long as the second output signal D2 maintains the H level, and the wiper driver circuit 20 stops outputting the wiper driving signal WD when the second output signal D2 is switched to the L level.

Accordingly, the wipers 9 start to be driven when the third output signal D3 is switched to the H level, and stops being driven when the second output signal D2 is switched to the L level.

In this manner, since the amplification factor of the amplifier circuit 17 is adjusted by the feedback circuit 18 when the electric power for the rain sensor 2 is switched ON, so as to maintain the output signal S of the amplifier circuit 17 at a constant value irrespective of the operation condition of the wipers 9, and since the amplification factor of the amplifier circuit 17 is also adjusted by the feedback circuit 18 at a predetermined timing thereafter, and since the output signal S is then compared with the preset voltages R1, R2 and R3 appropriately, the wipers 9 are thereby driven depending upon the raining (or water generating) condition from the time when the electric power for the rain sensor 2 is turned ON.

Figure 5:
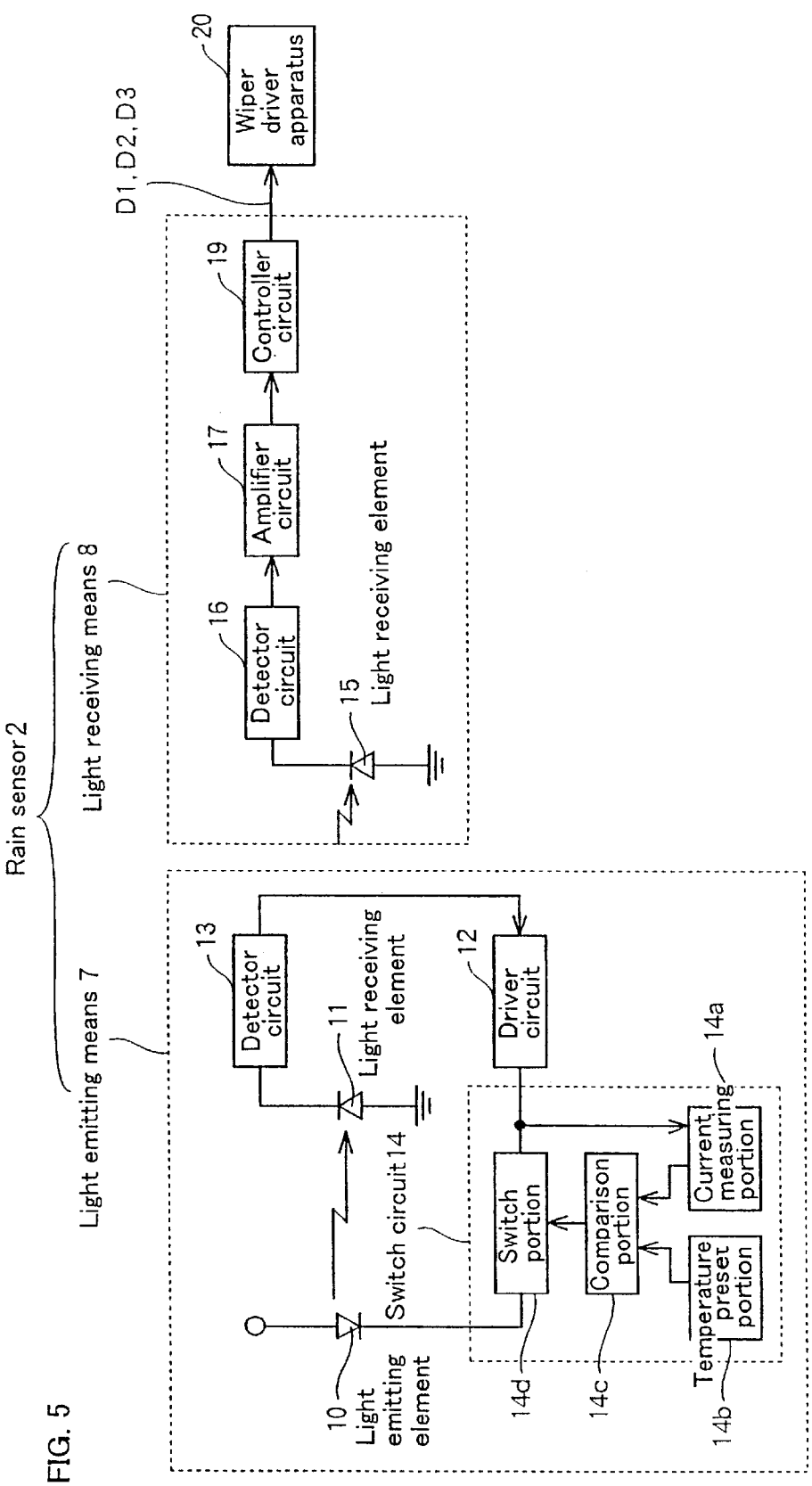

Next, a wiper controller apparatus utilizing a protection method for the rain sensor according to the present invention, as shown in FIG. 5, comprises a rain sensor 2 having a light emitting means for guiding or introducing light into the window glass 1 in such a manner that it undergoes total internal reflection upon the inner surface thereof, a light receiving means 8 for receiving the light reflected within the window glass 1, and a wiper driver means 20 for driving the wipers 9 at a desired velocity based upon an output signal of the light receiving means 8.

The light emitting means 7 comprises a light emitting element 10 such as a LED, LD and so on, a light receiving element 11 for detecting light output from the light emitting element 10, such as a PD and so on, a driver circuit 12 for making the light emitting element 10 output light modulated with a predetermined frequency, a detector circuit 13 for taking out or receiving a signal corresponding to the modified component from the output light of the light receiving element 11, and a switch circuit 14 for electrically turning the light emitting element 10 and the driver circuit 12 ON or OFF. Also, the output signal of the detector circuit 13 is fed back to the driver circuit 12.

A switch circuit 14 comprises a current measuring portion 14a for measuring the driving current of the light emitting element 10, which fluctuates due to changes in the ambient temperature; a temperature setting portion 14b for presetting a lower preset temperature value RL (for example, 5° C.) and a higher preset temperature value RH (for example, 60° C.) in advance, i.e., for determining a range of temperature (for example, 5–60° C.) where the driving current is supplied to the light emitting element 10; a comparison portion 14c for comparing a measured value Id of the current measuring portion 14a with either the lower preset temperature value RL or the higher preset temperature value RH of the temperature setting portion 14b, so as to output an OFF instruction signal when the measured value Id lies outside the preset temperature range (for instance, Id<RL or Id>RH); and, a switch portion 14d for interrupting the electrical connection between the light emitting element 10 and the driver circuit 12.

The lower preset temperature value RL and the higher preset temperature value RH preset at the temperature setting portion 14b are freely adjustable in the values thereof.

However, since the semiconductor element, such as a LED, LD or the like, which is used as the light emitting element 10 has a negative temperature coefficient, it has a temperature characteristic whereby the driving current rises following any increase of the temperature. Accordingly, if the ambient temperature surrounding a printed circuit board on which various kinds of circuits are installed for constructing the light emitting means 7 rises during the driving of the rain sensor 2, the driving current of the light emitting element 10 is also increased due to the temperature characteristic thereof.

In FIG. 5, the current measuring portion 14a for measuring the driving current of the light emitting element 10 is utilized as a means for detecting the ambient temperature of the rain sensor 2. Alternatively, a temperature detecting element can be provided in a vicinity of either one or both of the light emitting element 10 and the light receiving element 15 so as to compare an output signal of the temperature detecting element with the lower preset temperature value RL or the higher preset temperature value RH. As the temperature detecting element there can be applied a diode having a temperature-dependent forward voltage Vf at the juncture thereof, or a thermocouple or the like. In a case where a plurality of temperature detecting elements are provided, an average value of the output signals may be compared with the lower preset temperature value RL or the higher preset temperature value RH.

Also, in the light emitting means 7, since the signal corresponding to the modified component is taken from the output signal of the light receiving element 11 by the detector circuit 13, and since it is fed back to the driver circuit 12 of the light emitting element 10 so as to control the output of light by the light emitting element 10 at the desired value, the output of light by the light emitting element 10 can be maintained at the desired value irrespective of any changes in the ambient temperature around the light emitting means 7.

The light receiving means 8 also comprises a light receiving element 15 such as a PD and so on, a detector circuit 16 for taking out or receiving the signal corresponding to the modified component output by the driver circuit 12 of the light emitting means 10, an amplifier circuit 17 for amplifying an output signal of the detector circuit 16, and a controller circuit 18 which calculates and processes the output signal S of the amplifier circuit 17 so as to output three kinds of signals, namely a first output signal D1, a second output signal D2, and a third output signal D3.

Since the detector circuit 16 takes out or receives only the signal corresponding to the modified component of the light emitting means 10 from the signal output from the light receiving element 15 to input it into the wiper driver apparatus 20 through the amplifier circuit 17 and the controller circuit 18, the wiper controller apparatus will never operate erroneously, even under the influence of outside ambient light, that sometimes reaches 150,000 lux under strong sunlight in mid-summer, although it may reach only a few lux in darkness at midnight.

In the controller circuit 18, first of all, the output signal S of the amplifier circuit 17 is compared with three preset voltage levels, sequentially from the higher one, i.e., a first preset level R1, a second preset level R2, and a third preset level R3.

With the rain sensor 2 which is used in the present invention, as previously mentioned, the more that water drops are adhered to or present upon the outside surface of the window glass 1, the lower the output signal level of the light receiving element 15. Therefore, the voltage level of the output signal S is at a maximum when no water drops are adhered to nor present upon the surface of the window glass, while is at a minimum many water drops are adhered to or present thereon.

Further, when the output signal S of the amplifier circuit 17 is less or smaller than the first preset level R1 (S<R1), the first output signal is switched to the H level. The second output signal D2 is switched to the H level when it is less or smaller than the second preset level R2 (S<R2), and further the third output signal D3 is switched to the H level when it is less or smaller than the third preset level R3 (S<R3).

Here, when the first output signal D1 is at the H level, this corresponds to a condition of drizzly or misty rain or a condition of light rain. When the second output signal D2 is at the H level, it corresponds to a condition of medium rain, and when the third output signal D3 is at the H level, it corresponds to a condition of heavy rain. Then, after switching the rain sensor 2 ON by inputting power from an electric power source, when all the output signals D1, D2 and D3 of the controller circuit 19 are switched to the H levels, the wiper driving signal WD is outputted from the wiper driver circuit 20, and then the wipers 9 starts to be driven.

In this instance, the driving of the wipers 9 can be started after ejection of a predetermined amount of window washer liquid onto the window glass 1 or together with the ejection thereof.

After that, even if the third output signal D3 is switched to the L level, the wiper driving signal WD continues to be outputted as far as the second output signal D2 maintains the H level, and the wiper driver circuit 20 stops outputting of the wiper driving signal WD when the second output signal D2 is switched to the L level.

Accordingly, the wipers 9 starts to be driven when the third output signal D3 is switched to the H level, and stops to be driven when the second output signal D2 is switched to the L level.

If the automobile to which the present invention is applied is driven or parked under bright, hot sunshine while the rain sensor 2 is turned ON, i.e., while it switched to the driving condition, the ambient temperature around the printed circuit board which comprises the various circuits of the light emitting element 10 is increased, and the following calculation process is executed in the switch circuit 14.

First, when the ambient temperature rises to exceed the higher preset temperature value RH (for example, 60° C.), then the value Id measured by the current measuring portion 14a, corresponding to the ambient temperature, also exceeds the higher preset temperature value RH (Id>RH).

Next, since the higher preset temperature value RH and the measured value Id are always compared, the comparison portion 14c outputs the OFF instruction signal when the condition Id>RH is satisfied.

Then, the switch portion 14d is switched into the OFF condition due to the OFF instruction signal, and thereby the electrical connection between the light emitting element 10 and the driver circuit 12 is interrupted or shut down, so that the supply of driving current to the light emitting element 10 by means of the driver circuit 12 is stopped.

Accordingly, the driving of the light emitting element 10 is stopped when the temperature is high, thereby prevented the light emitting element 10 from being damaged, and/or preventing malfunction of the various circuits thereof, which would otherwise be caused by the continued driving of the light emitting element 10.

If the automobile to which the present invention is applied is driven or parked in cold districts or places while the rain sensor 2 is switched ON, or while it is in the driving condition, the ambient temperature of the printed circuit board which comprises the various circuits of the light emitting means 7 is decreased, and the following calculation process is executed in the switch circuit 14.

When the ambient temperature falls below the lower preset temperature value RL (for example, 5° C.), then the value Id measured by the current measuring portion 14a, corresponding to the ambient temperature, also becomes lower than the lower preset temperature RL (Id<RL).

Next, since the lower preset temperature value RL and the measured value Id are always compared, the comparison portion 14c outputs the OFF instruction signal when the condition Id<RL is satisfied.

Then, the switch portion 14d is switched to OFF due to the OFF instruction signal, and thereby the electrical connection between the light emitting element 10 and the driver circuit 12 is interrupted or shut down, so that the supply of driving current to the light emitting element 10 by means of the driver circuit 12 is stopped.

Accordingly, the driving of the light emitting element 10 is stopped under low temperatures, in particular when the ambient temperature is lower than zero (0)° C., thereby preventing burn-out of the driving motor which would otherwise occur by supplying excess driving current thereto when the wipers 9 are inoperable due to being frozen.

Further, for switching the rain sensor 2 into the driving condition again, a starting switch for the rain sensor 2 is once switched to OFF and then is switched to ON. Namely, by turning the starting switch of the rain sensor 2 ON once again, the switch circuit 14 is reset into the ON condition, thereby making the system again operable under the driving condition.

What is claimed is:

1. A protection method for a rain sensor comprising light emitting means for guiding light into a window glass so as to undergo total internal reflection within said window glass; light receiving means for receiving the light which has undergone total internal reflection within said window glass; and means for detecting the amount of water drops adhered or present upon an outside surface of said window glass based on an output signal of said light receiving means, wherein said method comprises:

measuring a driving current supplied to said light emitting means;

converting the driving current into a value corresponding to the ambient temperature; and stopping supply of the driving current to said light emitting means when said value exceeds a preset higher temperature.

2. A protection method for a rain sensor as claimed in claim 1, wherein said higher preset temperature can be freely adjusted in advance.

3. A protection method for a rain sensor comprising light emitting means for guiding light into a window glass so as to undergo total internal reflection within said window glass; light receiving means for receiving the light which has undergone total internal reflection within said window glass; and means for detecting the amount of water drops adhered or present upon an outside surface of said window glass based on an output signal of said light receiving means, wherein said method comprises:

measuring a driving current supplied to said light emitting means;

converting the driving current into a value corresponding to the ambient temperature; and stopping supply of the driving current to said light emitting means when said value is less than a preset lower temperature.

4. A protection method for a rain sensor as claimed in claim 3, wherein said lower preset value temperature can be freely adjusted in advance.

* * * * *